United States Patent
Gallet

(10) Patent No.: US 8,197,213 B2
(45) Date of Patent: Jun. 12, 2012

(54) TURBOPROP INCLUDING A SET OF ADJUSTABLE-PITCH BLADES

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 1251 days.

(21) Appl. No.: 11/937,168

(22) Filed: Nov. 8, 2007

(65) Prior Publication Data

US 2009/0311100 A1    Dec. 17, 2009

(30) Foreign Application Priority Data

Nov. 9, 2006    (FR) .................................... 06 54797

(51) Int. Cl.
*F01D 5/30*    (2006.01)
(52) U.S. Cl. ........................................ 416/155; 416/166
(58) Field of Classification Search .................. 416/149, 416/150, 155, 165, 167
See application file for complete search history.

(56) References Cited

U.S. PATENT DOCUMENTS

| | | | | |
|---|---|---|---|---|
| 4,076,453 A | * | 2/1978 | Feroy | 416/174 |
| 5,145,318 A | * | 9/1992 | Olson | 416/167 |
| 6,077,040 A | * | 6/2000 | Pruden et al. | 416/45 |
| 2003/0077173 A1 | * | 4/2003 | Franchet et al. | 416/30 |
| 2006/0188375 A1 | | 8/2006 | Bussieres et al. | |

FOREIGN PATENT DOCUMENTS

| | | |
|---|---|---|
| EP | 0 137 873 A1 | 4/1985 |
| EP | 0 155 073 A2 | 9/1985 |
| EP | 1 306 558 A1 | 5/2003 |
| FR | 2 250 077 | 5/1975 |
| GB | 2 077 855 A | 12/1981 |

OTHER PUBLICATIONS

U.S. Appl. No. 12/017,566, filed Jan. 22, 2008, Gallet.
U.S. Appl. No. 12/019,155, filed Jan. 24, 2008, Gallet

* cited by examiner

*Primary Examiner* — Edward Look
*Assistant Examiner* — Dwayne J White
(74) *Attorney, Agent, or Firm* — Oblon, Spivak, McClelland, Maier & Neustadt, L.L.P.

(57) ABSTRACT

A turboprop including a rotary casing fitted with adjustable-pitch blades enabling thrust to be managed. Each blade is coupled, for the purpose of adjusting its pitch, to a control member of an annular actuator carried by the rotary casing.

7 Claims, 2 Drawing Sheets

TURBOPROP INCLUDING A SET OF ADJUSTABLE-PITCH BLADES

The invention relates to a turboprop including at least one set of controlled adjustable-pitch blades, with the adjustable pitch of the blades constituting one of the parameters that enables the thrust of the turboprop to be managed. The invention relates more particularly to controlling the pitch of the blades.

BACKGROUND OF THE INVENTION

A two-propeller turboprop is known, e.g. from U.S. Pat. No. 4,621,978, that comprises a turbine having two contrarotating rotors driving two respective sets of adjustable-pitch blades. The invention applies in particular to that type of airplane turboprop. Various mechanisms are known for controlling the pitch of the blades. For example, one known system comprises a conventional actuator, arranged axially in the inside space provided at the center of the turbine having an annular flow path. Mechanical connections transmit drive from the rod of the actuator radially to the adjustable-pitch blades.

The elements of those connections are complex, bulky, heavy, and expensive. In addition, the forces to be transmitted are large, thus requiring high actuating pressures for the actuator, given the necessarily limited area of the piston thereof. This high control pressure is detrimental to the lifetime of the actuator. If both sets of blades are of adjustable pitch, then the actuator is generally common to both sets.

Maintenance is made complicated by the vital components being situated inside the casing, and more particularly, by some of them being situated inside the turbine. They cannot be changed without dismantling the turbine.

The invention seeks to overcome all of those drawbacks.

OBJECT AND SUMMARY OF THE INVENTION

More particularly, the invention provides a turboprop including at least one set of controlled adjustable-pitch blades constrained to rotate with a rotary casing mechanically connected to a turbine rotor, wherein each blade of said set is coupled, to adjust its orientation, to a control member of an annular actuator carried by said rotary casing, said actuator being common to the blades of said set.

It results from the above definition that the annular actuator situated on the outside, at the base of the set of blades that it serves to drive and in the immediate proximity thereof, is much lighter in weight and easier to maintain. The actuator is accessible since it is situated on the outside of the turboprop, and more particularly it is fastened on the rotary casing.

The area of the annular piston is large, thus enabling the pitch of the blades to be controlled using pressures that are much smaller. Finally, it is possible to provide a respective annular actuator for each set of blades, thereby providing an additional degree of freedom for managing the thrust of the turboprop.

In a possible embodiment, said annular actuator comprises a body having two coaxial cylindrical walls and two annular end walls. The body houses an annular piston that is movable between the two end walls. The piston is secured to the above-mentioned control member.

In one possibility, said control member comprises a cylindrical tubular element about the axis that is fastened to the piston, passing slidably and in leaktight manner through an annular opening formed in one of the end walls of the actuator.

In another possibility, said control member comprises a plurality of rods fastened to the piston, each passing slidably and in leaktight manner through a respective cylindrical opening formed in an annular end wall of the actuator.

Each blade is pivotally mounted on said rotary casing. Each blade pivots about an axis that is perpendicular to the axis of rotation of the turbine, and at its base it includes a crank arm hinged via its end to said control member of the actuator.

Advantageously, the actuator provides a turboprop in accordance with the above definition, comprising a turbine with two contrarotating rotors and two sets of adjustable-pitch blades constrained to rotate with two rotary casings connected to respective ones of said rotors, each set being actuated by an annular actuator carried by the corresponding rotary casing.

BRIEF DESCRIPTION OF THE DRAWINGS

The invention can be better understood and other advantages thereof appear more clearly in the light of the following description of a turboprop in accordance with the principle of the invention, given solely by example and made with reference to the accompanying drawings, in which.

MORE DETAILED DESCRIPTION

Figure 1:
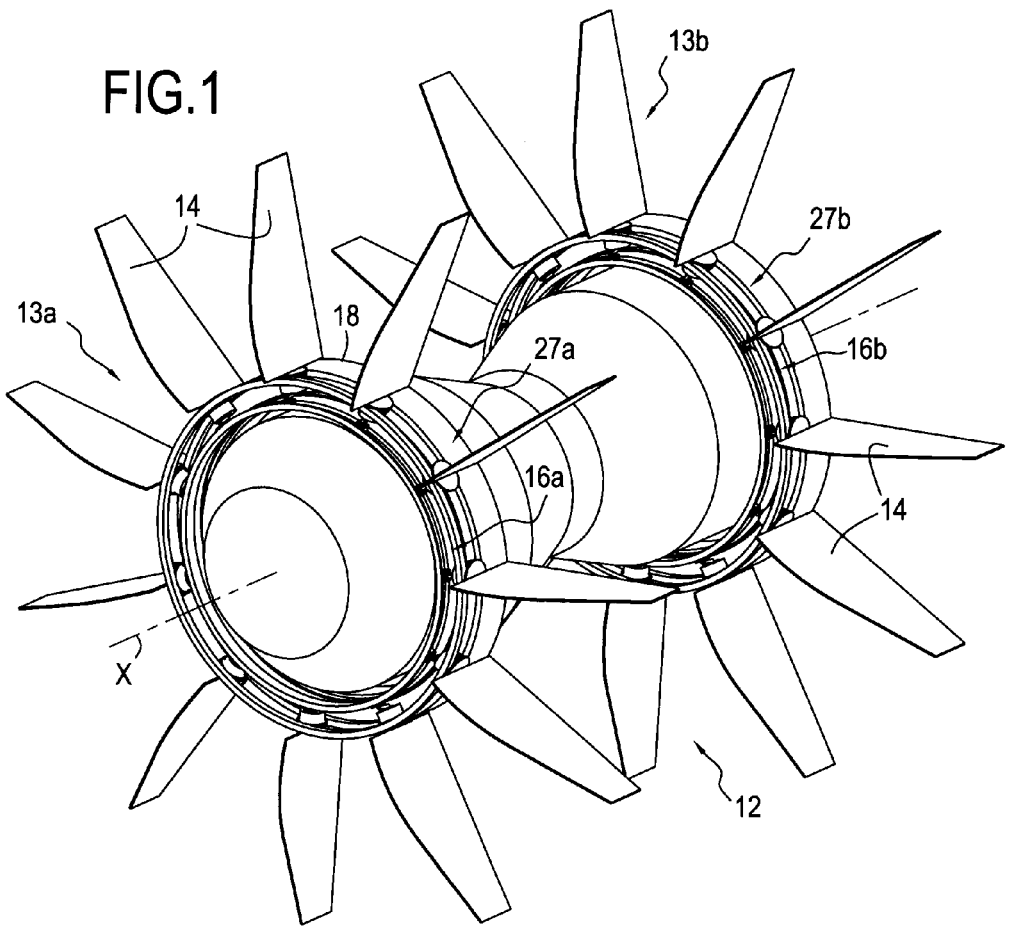
FIG. 1 is a general perspective view of the turboprop in accordance with the invention.

In the drawings, there can be seen a turboprop 11 comprising, in this example, two sets 13a, 13b of blades 14 that are of adjustable pitch. The blades 14 in each set 13a, 13b are mounted on a respective rotary casing 16a, 16b in the form of an annular platform, itself mounted to rotate on the surface of a stationary casing 18. The blades 14 of each set are regularly spaced circumferentially and they are oriented generally radially, on the surface of the rotary casing. The stationary casing and the rotary casings share a common axis X. The stationary casing 18 houses a combustion chamber and a turbine 20 with two contrarotating rotors 22a, 22b. Each rotor carries and drives in rotation one of the rotary casings 16a, 16b each having one of the above-mentioned sets 13a, 13b of adjustable-pitch blades mounted thereon. Such a set of blades is controlled to adjust the orientation of said blades in order to manage the thrust of the turboprop. The structure described above is functionally comparable to the structure described in U.S. Pat. No. 4,621,978, and its known aspects are not described in detail.

The invention relates mainly to the means for controlling the pitch of the blades in the or each set.

According to an important characteristic, each blade 14 of such a set 13a or 13b is coupled, for adjusting its pitch, to a control member 25 of an annular actuator 27a, 27b carried by said corresponding rotary casing 16a, 16b. The actuator is common to all of the blades of said set.

More particularly, each blade 14 of a set 13a, 13b is mounted on the corresponding rotary casing 27a, 27b to pivot about an axis that is perpendicular to the axis of rotation X of the turbine, and at its base it includes a crank arm 30 terminated by a ball 31. The ball is hinged to the control member 25 of the actuator 27a or 27b.

Figure 2:
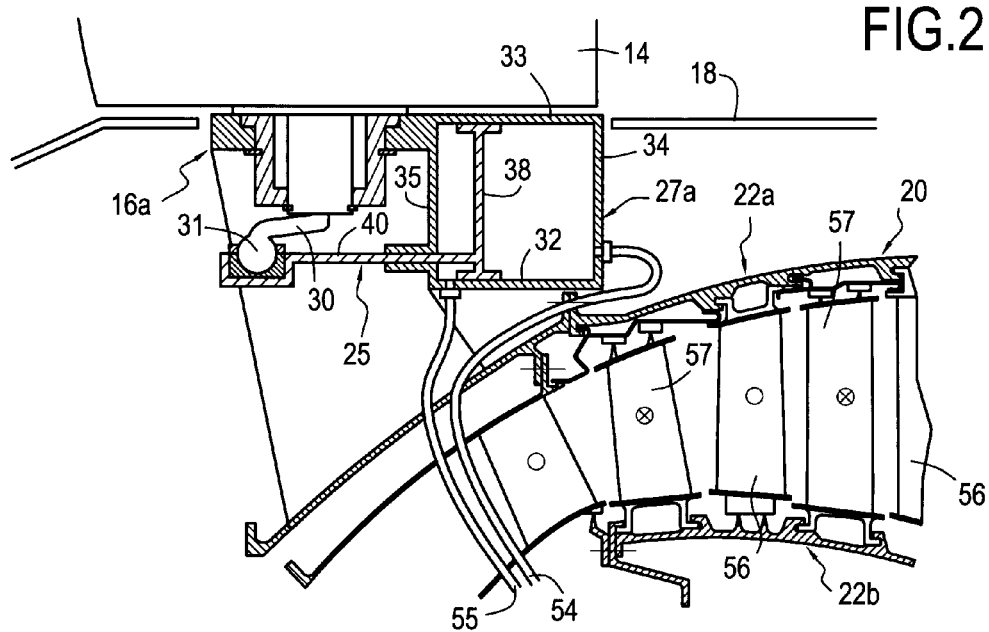
FIG. 2 is a fragmentary diagrammatic section view of the turboprop.
Figure 3:
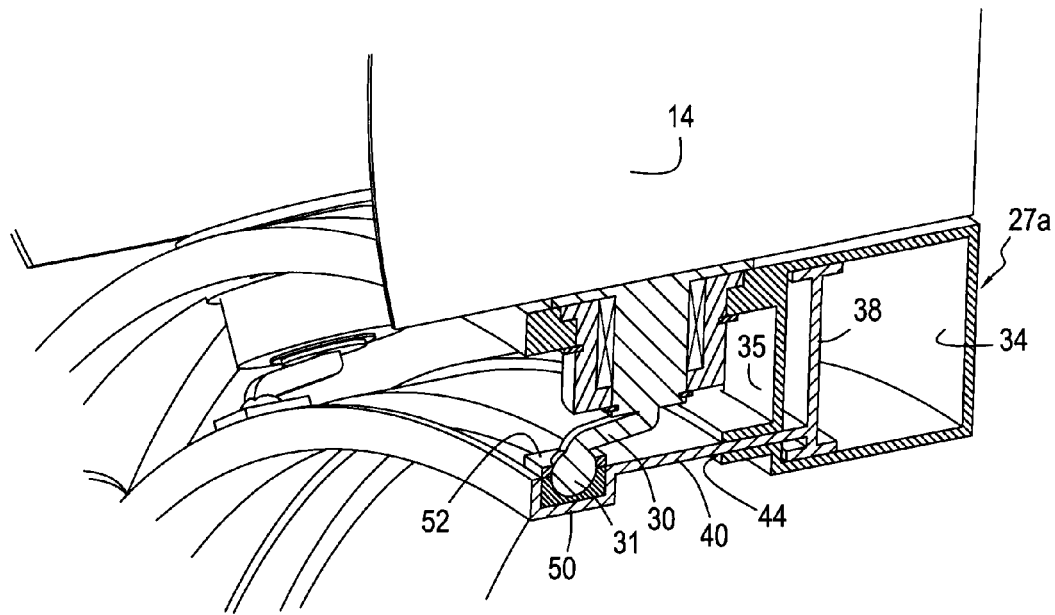
FIG. 3 is a detail view in perspective and in section of the blade control means.

The annular actuator 27a or 27b also includes a body having two cylindrical walls 32, 33 that are coaxial and two end walls 34, 35 that are annular. The body houses an annular piston 38 that is movable between the two end walls. The piston is secured to the control member 25. In the example of FIGS. 2 and 3, the control member 25 comprises a cylindrical tubular element 40 about the same axis, secured via one end to the piston 38 and passing slidably and in sealed manner through an annular opening 44 formed in the end wall 35 of the actuator. This end wall 35 is close to the blades, and the tubular element 40 is coupled to the set of balls 31 of all of the crank arms 30 of the blades 14.

More particularly, said control member 25 includes at its end a groove 50 that is annular about the common axis and that houses receptacles 52. The receptacles 52 can slide in the groove 50 so as to accommodate any relative movement that might be needed between the finger 30 and the groove 50. Each receptacle has a spherical inside surface. The balls 31 are hinged in corresponding receptacles 52. Consequently, rectilinear movement of the control member gives rise to a uniform and simultaneous change in the orientation of all of the blades 14 of said set 13a or 13b.

The two chambers of the actuator that are separated by the piston are fed with drive fluid via two ducts 54, 55 that pass through the corresponding rotor of the turbine and that join the stator of the turbine in the vicinity of the axis of the turboprop where annular drive fluid distribution chambers are arranged with leaktight rotary gaskets, of known type. By way of example, the drive fluid is oil.

In FIG. 2, it can be seen that the rotary casing 16a of the set of blades situated at the front of the turboprop is carried by the rotor 22a that presents an outer casing, and blades 56 that are directed radially inwards. It will be understood that the other rotary casing 16b is secured to the other rotor 22b comprising an inner casing and carrying blades 57 that are directed radially outwards. Thus, the turbine with two contrarotating rotors is associated with two sets of adjustable-pitch blades that are constrained in rotation with the two axially offset rotary casings that are connected to respective ones of the rotors. Each set of blades is actuated by its own annular actuator 27a, 27b carried by the corresponding rotary casing 16a, 16b.

Figure 4:
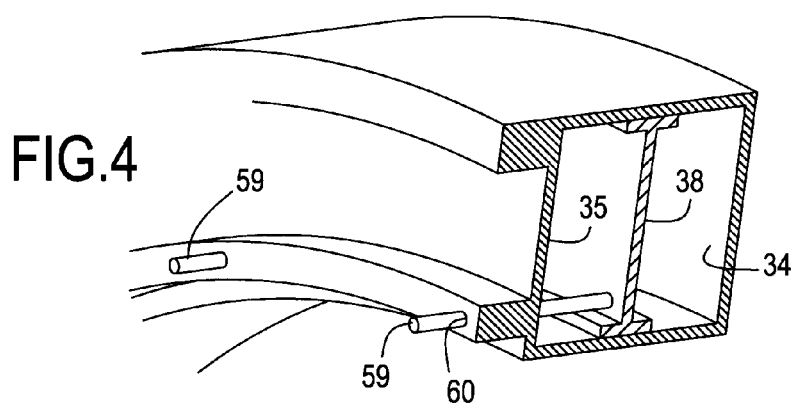
FIG. 4 is a detail view showing a variant of the actuator.

In the variant of FIG. 4, the control member comprises a plurality of rods 59 secured to the piston 38. Each rod passes slidably and in leaktight manner through a cylindrical opening 60 formed in the above-mentioned annular end wall 35. The rods are regularly distributed circumferentially. They may be connected to a coaxial annular groove of the same type as shown in FIG. 2. It is also possible to envisage that the number of rods is equal to the number of blades and that each rod 59 is terminated by a receptacle in which the ball of one of the blades is hinged.

What is claimed is:

1. A turboprop comprising:
    at least one set of controlled adjustable-pitch blades constrained to rotate with a rotary casing forming an annular platform arranged to rotate in the vicinity of an external surface of a stationary casing and mechanically connected to a turbine rotor,
    wherein each blade of said set is coupled to a control member of an annular actuator carried by said rotary casing to adjust an orientation of each blade, said actuator being common to the blades of said set.

2. A turboprop according to claim 1, wherein said annular actuator comprises a body having two coaxial cylindrical walls, and two annular end walls, and
    wherein said body houses an annular piston movable between the two end walls, said piston being secured to the control member.

3. A turboprop according to claim 1, wherein each blade is mounted on said rotary casing to pivot about an axis perpendicular to an axis of rotation of said turbine rotor, and
    wherein a base of each blade includes a crank arm with an end which is hinged to said control member of the actuator.

4. A turboprop according to claim 2, wherein said control member comprises a cylindrical tubular element about an axis of the turboprop, secured to the piston and passing slidably in leaktight manner through an annular opening formed in one of the end walls of said actuator.

5. A turboprop according to claim 2, wherein said control member comprises a plurality of rods fastened to the piston, each rod passing slidably and in leaktight manner through a respective cylindrical opening formed in one of the annular end walls.

6. A turboprop according to claim 2, wherein an end of said control member includes an annular groove about an axis of the turboprop, the groove housing receptacles in which balls forming ends crank arms at a base of each blade are hinged.

7. A turboprop according to claim 1, comprising a turbine having two contrarotating rotors and two sets of adjustable-pitch blades that are constrained to rotate with two rotary casings that are connected to respective ones of said rotors, each set being actuated by an annular actuator carried by the corresponding rotary casing.

* * * * *